United States Patent
Maeda et al.

(10) Patent No.: US 11,025,165 B2
(45) Date of Patent: Jun. 1, 2021

(54) DC/DC CONVERTER CONTROL DEVICE

(71) Applicant: Mitsubishi Electric Corporation, Tokyo (JP)

(72) Inventors: Kazushi Maeda, Tokyo (JP); Masaki Sawamura, Tokyo (JP); Hiroaki Tanihara, Tokyo (JP); Nobuhiro Kihara, Tokyo (JP); Yuta Komatsu, Tokyo (JP); Takashi Kaneyama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/610,579

(22) PCT Filed: Jun. 9, 2017

(86) PCT No.: PCT/JP2017/021425
§ 371 (c)(1),
(2) Date: Nov. 4, 2019

(87) PCT Pub. No.: WO2018/225235
PCT Pub. Date: Dec. 13, 2018

(65) Prior Publication Data
US 2020/0153333 A1    May 14, 2020

(51) Int. Cl.
*H02P 1/18*      (2006.01)
*H02M 3/158*   (2006.01)
(Continued)

(52) U.S. Cl.
CPC ............ *H02M 3/158* (2013.01); *H02M 1/32* (2013.01); *H02P 7/292* (2013.01)

(58) Field of Classification Search
CPC .......... H02M 3/158; H02M 1/32; H02P 7/292
See application file for complete search history.

(56) References Cited

U.S. PATENT DOCUMENTS

| | | | |
|---|---|---|---|
| 2012/0062027 A1* | 3/2012 | Domoto | B60L 50/61 307/9.1 |
| 2013/0119961 A1 | 5/2013 | Okuda et al. | |
| 2017/0279356 A1* | 9/2017 | Kihara | H02P 1/18 |

FOREIGN PATENT DOCUMENTS

| JP | 2013-211983 A | 10/2013 |
|---|---|---|
| JP | 5457559 B2 | 4/2014 |

(Continued)

OTHER PUBLICATIONS

International Search Report for PCT/JP2017/021425 dated Aug. 1, 2017 {PCT/ISA/210].

(Continued)

*Primary Examiner* — Cortez M Cook
(74) *Attorney, Agent, or Firm* — Sughrue Mion, PLLC; Richard C. Turner (57) ABSTRACT

With respect to a failure in voltage sensors each for detecting a high-voltage-side voltage in a DC/DC converter, it is so arranged that a circuit failure of the DC/DC converter is prevented, and that the DC/DC converter is continuingly controlled. Two voltage sensors are included therein each for detecting a high-voltage-side voltage, so that, even when a first voltage sensor for detecting a high-voltage-side voltage on one side fails to work properly, a control device turns on a second switching device, and detects a voltage by a second voltage sensor for detecting the high-voltage-side voltage on the other side, whereby a failure of the voltage sensor for detecting the high-voltage-side voltage is detected.

5 Claims, 8 Drawing Sheets

(51) Int. Cl.
*H02M 1/32* (2007.01)
*H02P 7/292* (2016.01)

(56) References Cited

FOREIGN PATENT DOCUMENTS

| | | |
|---|---|---|
| JP | 2016-116262 A | 6/2016 |
| JP | 2017-005883 A | 1/2017 |
| WO | 2016/167185 A1 | 10/2016 |

OTHER PUBLICATIONS

Written Opinion for PCT/JP2017/021425 dated Aug. 1, 2017 {PCT/ISA/210].
Communication dated Nov. 24, 2020 from the Japanese Patent Office in Application No. 2019-523307.
Communication dated Dec. 3, 2020, from the China National Intellectual Property Administration in Application No. 201780091558.7.

* cited by examiner

DC/DC CONVERTER CONTROL DEVICE

CROSS REFERENCE TO RELATED APPLICATIONS

This application is a National Stage of International Application No. PCT/JP2017/021425 filed Jun. 9, 2017.

TECHNICAL FIELD

The present invention relates to a control device of a DC/DC converter.

BACKGROUND ART

As a conventional DC/DC converter (electrical power conversion apparatus), there exists an apparatus which has terminal groups, a reactor and a series-connected switching device circuit, and the apparatus performs buck-boost conversion of a voltage from a battery to an electric motor.

The terminal groups includes a first terminal and a second terminal, and the series-connected switching device circuit is a circuit whose first switching device and second switching device are connected in series.

As for the series-connected pair of the first switching device and the second switching device, a connection point of the first switching device and the second switching device is connected to the first terminal by way of the reactor, and an opposite side to the connection point of the first switching device and the second switching device is connected to the second terminal.

The first terminal is defined as a low voltage side, and the second terminal is defined as a high voltage side, so that the conversion of DC voltages is performed between the low voltage side and the high voltage side.

The DC/DC converter has a calculation means and a turn-on/turn-off control means.

The calculation means calculates a calculation value based on the difference in voltage between a high-voltage-side voltage instruction value being a voltage instruction value on a high voltage side and a high-voltage-side voltage detection value being a detection value of a voltage on the high voltage side, or on the difference in voltage between a low-voltage-side voltage instruction value being a voltage instruction value on a low voltage side and a low-voltage-side voltage detection value being a detection value of a voltage on the low voltage side.

The turn-on/turn-off control means acquires a duty factor based on the calculation value, and, based on the duty factor, controls turn-on/turn-off operations of the first switching device and the second switching device (for example, refer to Patent Document 1).

RELATED ART DOCUMENT

Patent Document

[Patent Document 1] Japanese Patent Publication No. 5457559

SUMMARY OF THE INVENTION

Problems to be Solved by the Invention

In a conventional DC/DC converter, a state of a high-voltage-side voltage sensor is detected at any time by the voltage sensor for detecting a high-voltage-side voltage, so that malfunction or failure determination is performed whether a value having been detected is normal or abnormal.

In a case in which a voltage sensor for detecting a high-voltage-side voltage is not caused to fail, the DC/DC converter is set in an ordinary mode, and voltage transformation is performed by a switching process, whereas, in a case in which a voltage sensor for detecting a high-voltage-side voltage is caused to fail, it becomes no more possible to detect a high-voltage-side voltage, and therefore, the second switching device is fixed in a turn-on state.

When a voltage sensor for detecting a high-voltage-side voltage is caused to fail, the control is continued while a high-voltage-side voltage and a low-voltage-side voltage hold a certain constant relationship therebetween; however, the voltage sensor for detecting the high-voltage-side voltage is caused to fail, and therefore, when an operation of an electric motor alters on a power generation/traction part, an alteration thereon in a high-voltage-side voltage cannot be detected, so that the operations cannot be achieved in a safe state.

As a result, when a high-voltage-side voltage becomes excessively high, breakdown is thereby caused in a circuitry of the DC/DC converter, whereas, when the high-voltage-side voltage becomes excessively low, a voltage required for controlling the electric motor becomes lacking, and it thereby results in an out-of-control state.

The present invention has been directed at solving these problems described above, and an object of the invention is to prevent a circuit malfunction or failure of a DC/DC converter with respect to a failure in voltage sensors each for detecting a high-voltage-side voltage in the DC/DC converter, and to enable the DC/DC converter being continuingly controlled.

Means for Solving the Problems

In a DC/DC converter control device according to the present invention in which a DC/DC converter has a reactor whose one end is connected to a DC power source and has a switching circuit being configured to include a plurality of semiconductor switching devices and being connected to another end of the reactor, and converts an input voltage inputted from the DC power source and outputs a voltage after having converted the voltage inputted therefrom as an output voltage, the control device comprises: a low-voltage-side voltage sensor for detecting a low-voltage-side voltage being the input voltage; a low-voltage-side voltage detector for outputting a voltage, as for an input, being detected by the low-voltage-side voltage sensor; a first high-voltage-side voltage sensor for detecting a high-voltage-side voltage being the output voltage; a first high-voltage-side voltage detector for outputting a voltage, as an output therefrom, being detected by the first high-voltage-side voltage sensor; a second high-voltage-side voltage sensor for detecting the high-voltage-side voltage being the output voltage; a second high-voltage-side voltage detector for outputting a voltage, as an output therefrom, being detected by the second high-voltage-side voltage sensor; and a failure detection means for detecting a failure of the first high-voltage-side voltage sensor and that of the second high-voltage-side voltage sensor, wherein change-over control is performed on respective turn-on or turn-off of the plurality of semiconductor switching devices by using a low-voltage-side detection voltage by means of the low-voltage-side voltage detector, a first high-voltage-side detection voltage by means of the first high-voltage-side voltage detector, and a second high-voltage-side detection voltage by means of the second high-voltage-side voltage detector.

Effects of the Invention

According to the DC/DC converter control device of the present invention, two voltage sensors each for detecting a high-voltage-side voltage of a DC/DC converter are included, so that it is possible to monitor abnormality of a voltage sensor for detecting a high-voltage-side voltage while having turned on the high-voltage-side semiconductor switching device; and thus, even when one voltage sensor for detecting a high-voltage-side voltage is caused to fail, it is possible to achieve the monitoring by the other voltage sensor for detecting the high-voltage-side voltage in which failure detection is not caused, and to perform the failure detection of the high-voltage-side voltage, so that a circuit malfunction or failure of the DC/DC converter can be prevented, and the DC/DC converter can be continuingly controlled.

EMBODIMENTS FOR CARRYING OUT THE INVENTION

Embodiment 1

Figure 1:
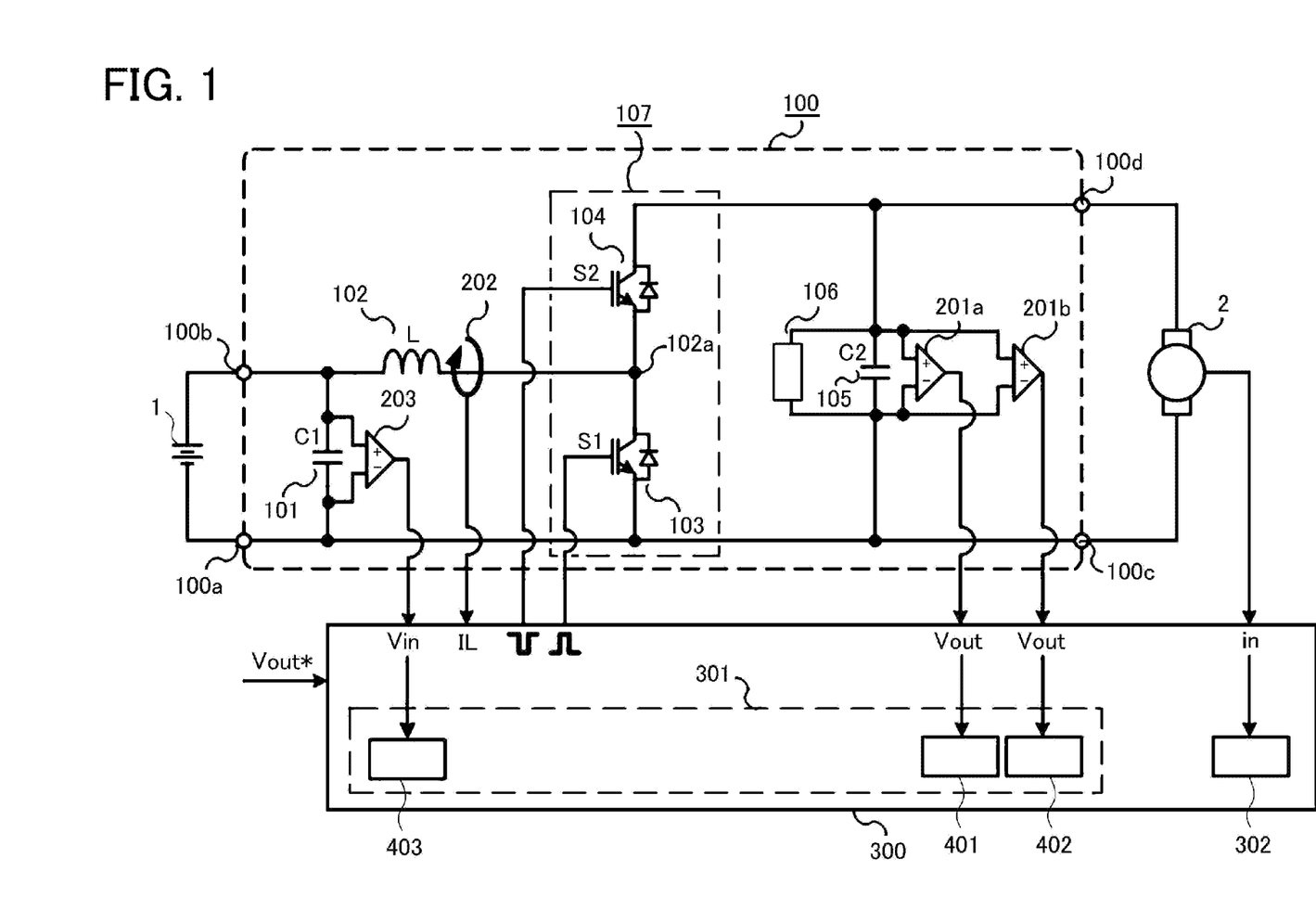
FIG. 1 is a configuration diagram illustrating a configuration of a DC/DC converter control device according to Embodiment 1 of the present invention.

FIG. 1 illustrates a configuration example of a DC/DC converter control device which is an embodiment of the present invention; first, the explanation will be made for Embodiment 1.

The control device of a DC/DC converter according to Embodiment 1 of the present invention is configured in a manner described below.

As illustrated in FIG. 1, a DC/DC converter (electrical power conversion apparatus) 100 has a reactor 102, a semiconductor module 107 which forms a switching circuit and is constituted of a first semiconductor switching device (low-voltage-side semiconductor switching device) 103 and a second semiconductor switching device (high-voltage-side semiconductor switching device) 104, and a low-voltage-side capacitor 101; and so, the DC/DC converter is configured to be controlled by means of a control device 300.

In addition, a high voltage battery 1 being a DC power source is connected to the low voltage side (across a terminal 100a and a terminal 100b) of the DC/DC converter 100, and correspondingly, an electric motor 2, to the high voltage side (across a terminal 100c and a terminal 100d) thereof. The electric motor 2 is a motor which is provided with an inverter for controlling an output from the DC/DC converter 100, and so, in FIG. 1, the inverter is illustrated as it is included in the electric motor 2. Namely, the electric motor 2 produces driving force by receiving electric power supply from a DC power source electrically connected to the inverter. Moreover, it may be adopted that, in addition to such a function of the electric motor, the electric motor 2 has a function of an electric generator.

Here, the inverter described above is a DC/AC conversion apparatus which performs electrical power conversion between the DC power source and the electric motor 2. The inverter is configured as a bridge circuit in which two switching devices interconnected in series between a positive electrode wiring-line connected to the positive electrode of the DC power source and a negative electrode wiring-line connected to the negative electrode of the DC power source are provided with a set of three pairs, which correspond to respective three-phase (phase-U, phase-V and phase-W) windings of the electric motor 2. A connection point interconnecting a switching device on the positive electrode side and a switching device on the negative electrode side in series is connected to a winding corresponding to each of the phases. As for the switching device, a chip of an IGBT (Insulated Gate Bipolar Transistor), a MOSFET (Metal Oxide Semiconductor Field Effect Transistor) or the like is utilized to which a freewheeling diode is connected in antiparallel with each other.

FIG. 1 illustrates a system of one electric motor; however, there also exists a system of two electric motors. In such a case, one electric motor is used as that on a power traction part, and one electric motor of the other is used as that on a power generation part.

Note that, each of the semiconductor switching devices 103 and 104 is individually constituted of, for example, an IGBT and a diode connected in antiparallel with each other.

Moreover, the DC/DC converter 100 has a first voltage sensor 201a for detecting a high-voltage-side voltage and a second voltage sensor 201b therefor, and a voltage sensor 203 for detecting a low-voltage-side voltage. In a failure detection means 301, a value of the first voltage sensor 201a for detecting a high-voltage-side voltage is outputted to a first high-voltage-side voltage detector 401; a value of the second voltage sensor 201b for detecting the high-voltage-side voltage is outputted to a second high-voltage-side voltage detector 402; and a value of the voltage sensor 203 for detecting a low-voltage-side voltage is outputted to a low-voltage-side voltage detector 403. A detection value of an electric current sensor 202 for detecting an electric current flowing through the reactor 102 is inputted into the control device 300.

In FIG. 1, the DC/DC converter (electrical power conversion apparatus) 100 is a type of bidirectional apparatus in which bidirectional electrical power conversion is made possible between the low voltage side and the high voltage side; the apparatus is so arranged that an input voltage (low-voltage-side voltage) inputted across the terminal 100a and the terminal 100b that are low-voltage-side terminals is stepped up or boosted to a voltage of the input voltage (low-voltage-side voltage) or more, and that an output voltage (high-voltage-side voltage) after having been boosted is outputted across the terminal 100c and the terminal 100d that are high-voltage-side terminals.

As for the first semiconductor switching device 103, one end thereof is connected to the negative electrode-side terminal of the low-voltage-side capacitor 101, and the other end thereof is connected to the positive electrode-side terminal of the low-voltage-side capacitor 101 by way of the reactor 102.

As for the second semiconductor switching device 104, one end thereof is connected to the other end of the first semiconductor switching device 103, and the other end thereof is connected to a positive electrode-side terminal of a high-voltage-side capacitor 105. The negative electrode-side terminal of the high-voltage-side capacitor 105 is connected to the one end of the first semiconductor switching device 103. In addition, a high-voltage-side electrical discharge resistor 106 is connected in parallel with the high-voltage-side capacitor 105.

The low-voltage-side capacitor 101 performs smoothing on an input voltage (low-voltage-side voltage). The reactor 102 is for use in energy storage. The semiconductor module 107 boosts the input voltage (low-voltage-side voltage) up to an output voltage (high-voltage-side voltage). Note that, each of the semiconductor switching devices 103 and 104 in the semiconductor module 107 turns on when a gate signal thereto is at "High" in the embodiments. The high-voltage-side capacitor 105 performs smoothing on the output voltage (high-voltage-side voltage). The high-voltage-side electrical discharge resistor 106 is utilized for releasing electric charges stored in the high-voltage-side capacitor 105. The control device 300 produces the gate signal for each of the semiconductor switching devices 103 and 104, and performs the turn-on/turn-off operations on each of the semiconductor switching devices 103 and 104.

In the failure detection means 301, when a failure of the first voltage sensor 201a for detecting a high-voltage-side voltage is detected based on a first high-voltage-side detection voltage V2S having been detected by the first high-voltage-side voltage detector 401, the control device 300 turns on the second semiconductor switching device 104, and also detects a failure of the second voltage sensor 201b for detecting the high-voltage-side voltage by using a second high-voltage-side detection voltage V2M outputted from the second high-voltage-side voltage detector 402. According to this arrangement, the control device 300 turns on the second semiconductor switching device 104, and can also detect abnormality of a high-voltage-side output voltage by using the first high-voltage-side detection voltage V2S having been monitored by the first high-voltage-side voltage detector 401, so that the operations can be continuously achieved even after a failure of the first voltage sensor 201a for detecting the high-voltage-side voltage, or after a failure of the second voltage sensor 201b for detecting the high-voltage-side voltage.

Embodiment 2

Hereinafter, the explanation will be made for Embodiment 2 of the present invention.

Figure 2:
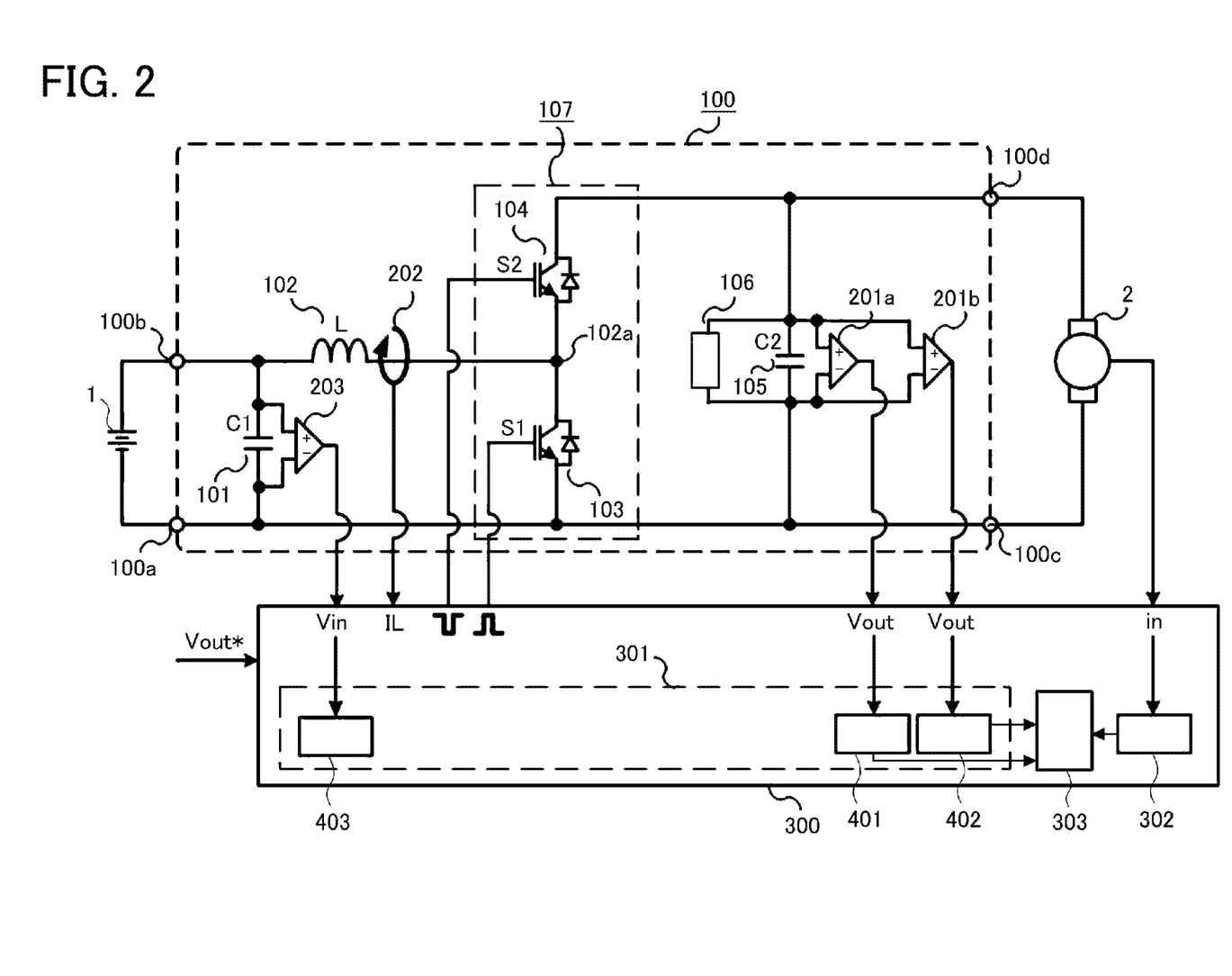
FIG. 2 is a configuration diagram illustrating a configuration of a DC/DC converter control device according to Embodiment 2 of the present invention.

FIG. 2 is a configuration diagram illustrating a DC/DC converter control device for explaining Embodiment 2 of the present invention.

The basic configuration of the DC/DC converter control device in Embodiment 2 is the same as that in Embodiment 1; however, in Embodiment 2, as illustrated in FIG. 2, an operational information acquisition means 302 acquires operational information (an electric motor's number of revolutions N, and switching information of the second semiconductor switching device 104) of the electric motor 2, and monitors individual states thereof. A high-voltage-side voltage estimation means 303 is further provided, and information is inputted thereinto from the first high-voltage-side voltage detector 401, the second high-voltage-side voltage detector 402 and the operational information acquisition means 302.

Figure 3:
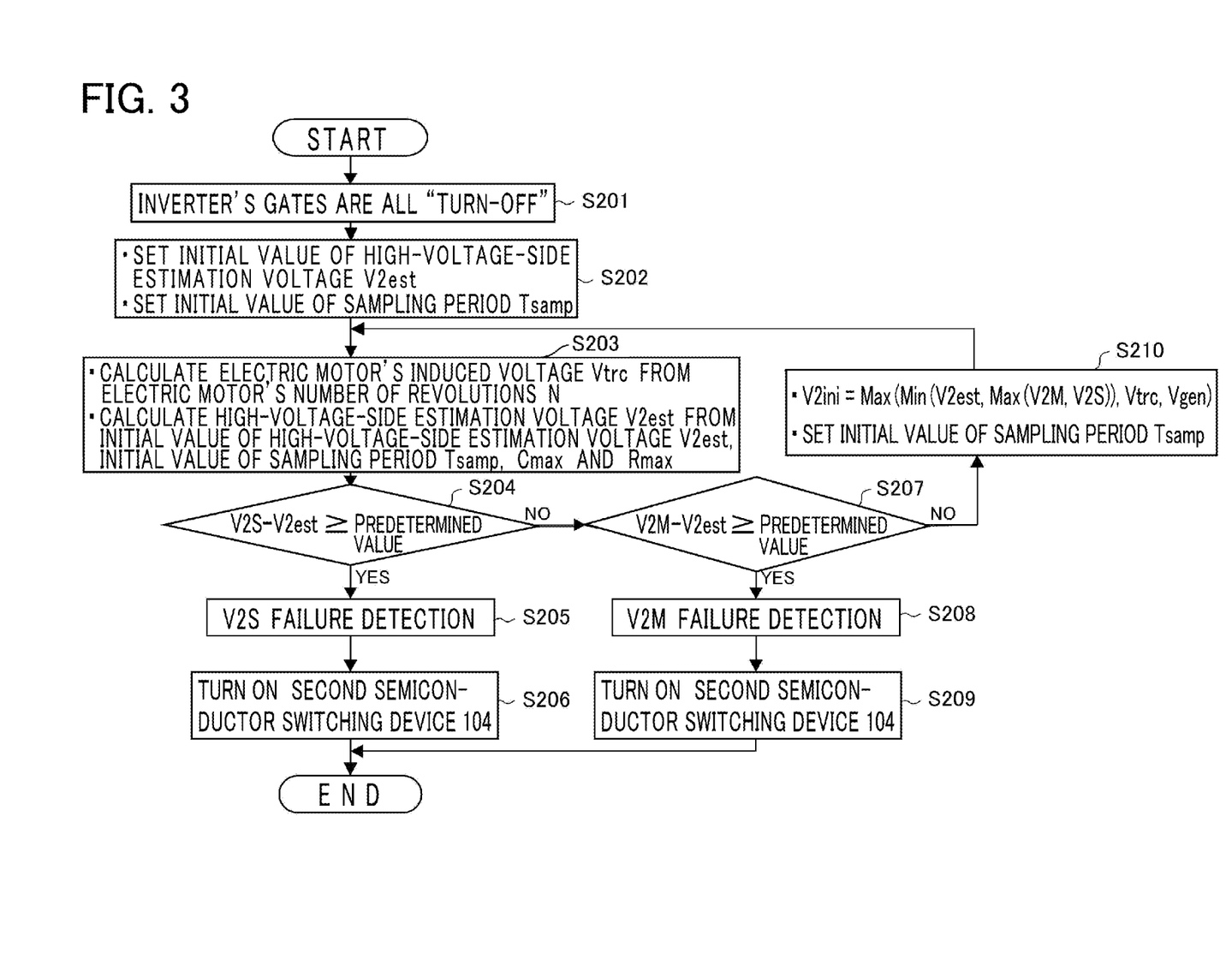
FIG. 3 is a flowchart illustrating a flow of the operations of control for carrying out estimation of a high-voltage-side estimation voltage and failure detection of voltage sensors in the DC/DC converter control device according to Embodiment 2 of the present invention.

FIG. 3 is a flowchart showing an estimation method of a high-voltage-side estimation voltage for explaining Embodiment 2 of the present invention, and a flow of the processing to detect, from a high-voltage-side estimation voltage and high-voltage-side detection voltages, a failure of the first voltage sensor 201a for detecting a high-voltage-side voltage, and that of the second voltage sensor 201b for detecting the high-voltage-side voltage.

As shown in FIG. 3, in a state of an inverter, which controls the electric motor 2, whose gates are all demonstrating "turn-off" (Step S201), an initial value of a high-voltage-side estimation voltage V2est and an initial value of a sampling period Tsamp are set in the first place (Step S202). An induced voltage Vtrc (power traction part) of the electric motor is calculated from an electric motor's number of revolutions N, and also a high-voltage-side estimation voltage V2est is calculated in the high-voltage-side voltage estimation means 303 from an initial value of a high-voltage-side estimation voltage V2est, that of a sampling period Tsamp, a maximum value of the high-voltage-side capacitor 105, Cmax, and a maximum value of the high-voltage-side electrical discharge resistor 106, Rmax (Step S203).

When the difference between a first high-voltage-side detection voltage V2S and a high-voltage-side estimation voltage V2est is a predetermined value defined in advance or more (Step S204), a failure of the first voltage sensor 201a for detecting a high-voltage-side voltage is detected (Step S205), and the second semiconductor switching device 104 is turned on (Step S206).

When the difference between a second high-voltage-side detection voltage V2M and a high-voltage-side estimation voltage V2est is a predetermined value defined in advance or more (Step S207), a failure of the second voltage sensor 201b for detecting the high-voltage-side voltage is detected (Step S208), and the second semiconductor switching device 104 is turned on (Step S209).

When either of the conditions described above is not satisfied, an initial value of a high-voltage-side estimation voltage V2est and an initial value of a sampling period Tsamp are set for a second time (Step S210), and a high-voltage-side estimation voltage V2est is calculated from the initial value of a high-voltage-side estimation voltage V2est and the initial value of a sampling period Tsamp (Step S203). Here, as for an initial value V2ini of a high-voltage-side estimation voltage V2est, a value in the maximum is set among the high-voltage-side estimation voltage V2est, a first high-voltage-side detection voltage V2S and a second high-voltage-side detection voltage V2M, and an electric motor's induced voltage Vtrc (power traction part) and an electric motor's induced voltage Vgen (power generation part). Note that, the electric motor's induced voltage Vtrc or Vgen is calculated from an electric motor's number of revolutions N.

According to the above, because the high-voltage-side estimation voltage is not a monitored value, but is an estimation value, failure detection can be performed without further adding a sensor(s).

In the embodiment, a configuration is taken on using the high-voltage-side electrical discharge resistor as an electrical discharge means; however, even when another configuration is taken on using a constant current circuit or the like, similar effects can be obtained.

Figure 4:
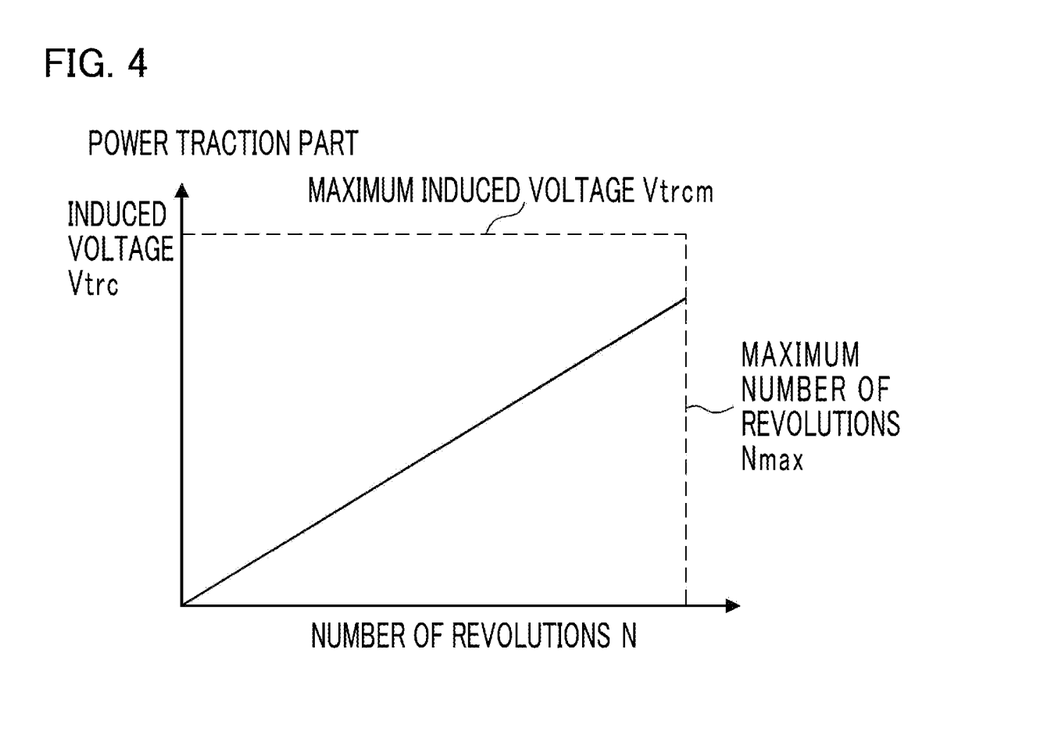
FIG. 4 is a diagram showing a correlation between an induced voltage of an electric motor on a power traction part and the number of revolutions thereof in the DC/DC converter control device according to Embodiment 2 of the present invention.
Figure 5:
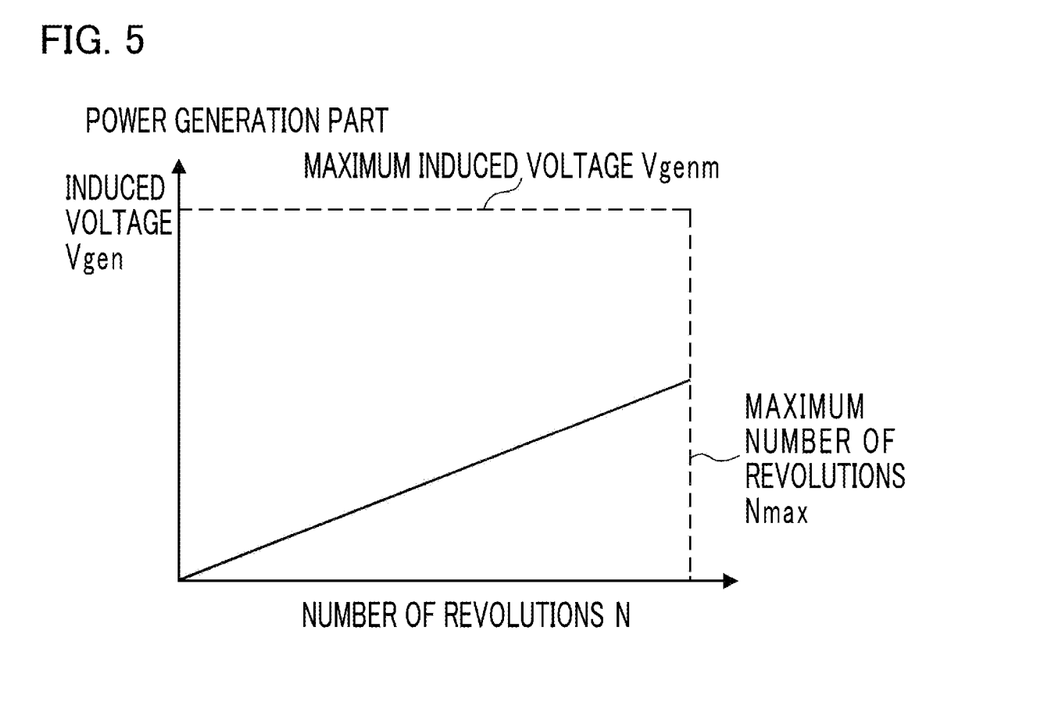
FIG. 5 is a diagram showing a correlation between an induced voltage of an electric motor on a power generation part and the number of revolutions thereof in the DC/DC converter control device according to Embodiment 2 of the present invention.

FIG. 4 and FIG. 5 are diagrams each showing a correlation between an induced voltage of an electric motor and the number of revolutions thereof in Embodiment 2 of the present invention. FIG. 4 shows a correlation between the number of revolutions N of the electric motor 2 and an induced voltage Vtrc thereof on a power traction part (in a state of power running operation) of the electric motor within a range of a maximum number of revolutions Nmax thereof and that of a maximum induced voltage Vtrcm thereof; and FIG. 5 shows a correlation between the number of revolutions N of the electric motor 2 and an induced voltage Vgen thereof on a power generation part (in a state of power generation and/or regenerative operation) within a range of a maximum number of revolutions Nmax and that of a maximum induced voltage Vgenm.

As shown in FIG. 4 and FIG. 5, because an induced voltage Vtrc or Vgen of an electric motor is proportional to the number of revolutions N of the electric motor, it is possible to acquire the induced voltage Vtrc or Vgen of the electric motor from the number of revolutions N of the electric motor; and, in a system having two electric motors, the numbers of revolutions of the two electric motors are measured, and the induced voltages Vtrc and Vgen of the electric motors are acquired on a power traction part and on a power generation part, respectively.

Embodiment 3

Hereinafter, the explanation will be made for Embodiment 3 of the present invention.

Figure 6:
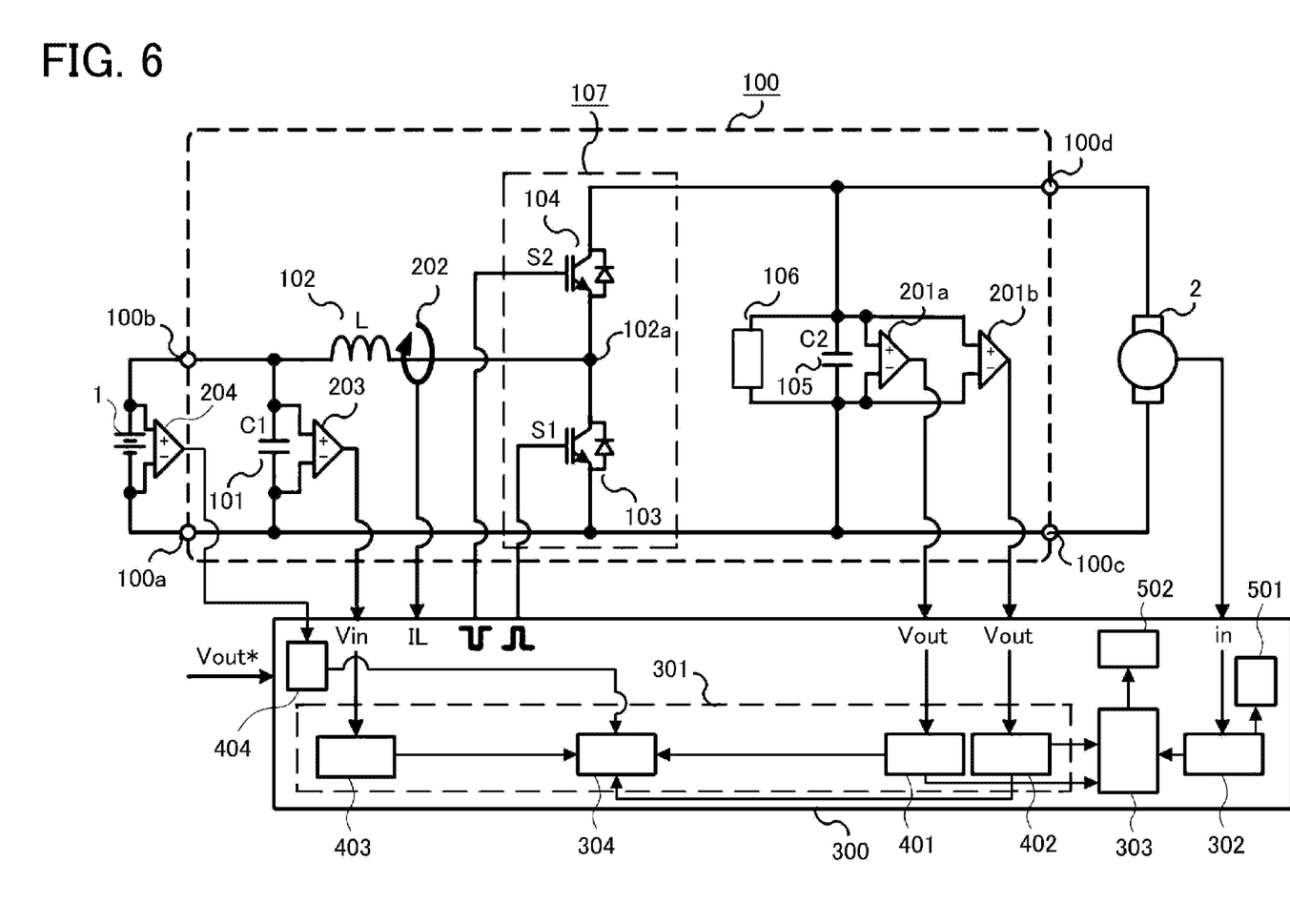
FIG. 6 is a configuration diagram illustrating a configuration of a DC/DC converter control device according to Embodiments 3 and 4 of the present invention.

FIG. 6 is a configuration diagram illustrating a DC/DC converter control device for explaining Embodiment 3 of the present invention.

The basic configuration of the DC/DC converter control device in Embodiment 3 is the same as that illustrated in FIG. 1; however, in Embodiment 3, a battery voltage detector 404 is provided for outputting information of a voltage detected by means of a battery voltage sensor 204 for detecting a voltage of the high voltage battery 1, as illustrated in FIG. 6. In addition, a failure detector 304 into which those outputs from the first high-voltage-side voltage detector 401, the second high-voltage-side voltage detector 402, the low-voltage-side voltage detector 403 and the battery voltage detector 404 are inputted is provided for detecting a failure of the first voltage sensor 201a and that of the second voltage sensor 201b. Furthermore, a processing unit 501 is provided which executes the processing when an induced voltage of the electric motor 2 is low.

Figure 7:
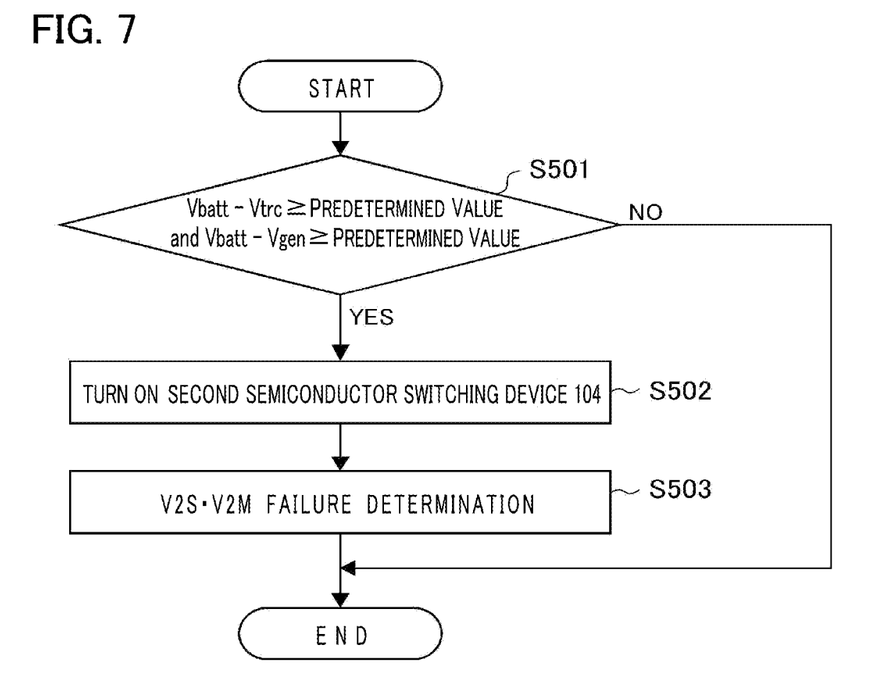
FIG. 7 is a flowchart illustrating a flow of the processing for detecting a failure of voltage sensors when an induced voltage is low in the DC/DC converter control device according to Embodiment 3 of the present invention.

FIG. 7 is a chart for explaining Embodiment 3 of the present invention, which is the flowchart showing the flow to detect a failure of the voltage sensors for detecting a high-voltage-side voltage after having turned on the second semiconductor switching device 104, when the induced voltages of the electric motor 2 are low.

As shown in FIG. 7, when the difference between a battery voltage Vbatt of the high voltage battery 1 and an electric motor's induced voltage Vtrc (power traction part) is a predetermined value defined in advance or more, and when the difference between the battery voltage Vbatt and an electric motor's induced voltage Vgen (power generation part) is a predetermined value defined in advance or more (Step S501), the second semiconductor switching device 104 is turned on (Step S502), and malfunction or failure determination is performed for the first voltage sensor 201a for detecting a high-voltage-side voltage and the second voltage sensor 201b for detecting the high-voltage-side voltage (Step S503).

Figure 8:
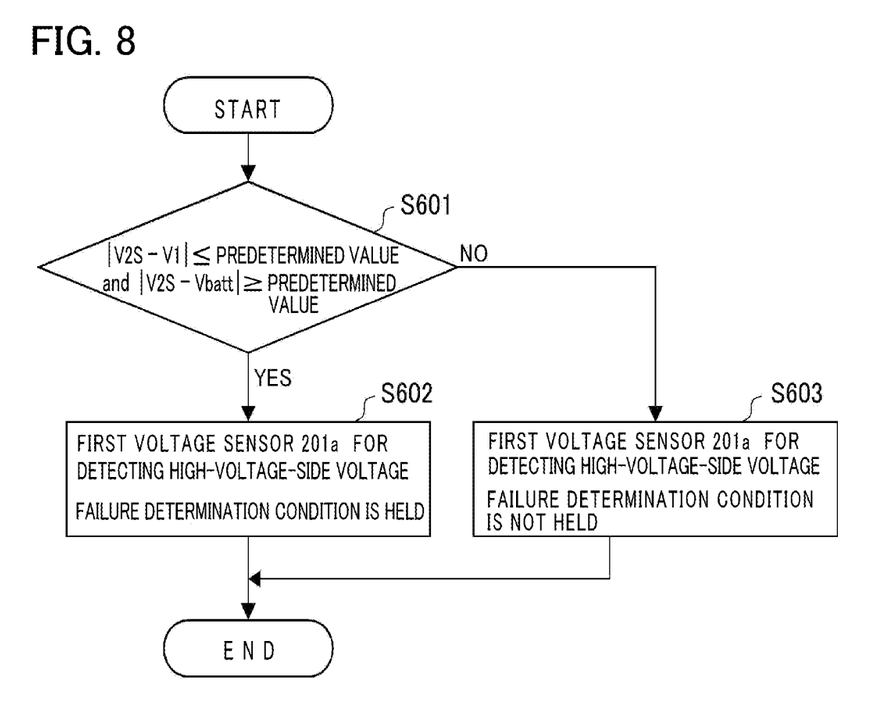
FIG. 8 is a flowchart illustrating a flow of the processing on failure determination of a voltage sensor for detecting a high-voltage-side voltage in the DC/DC converter control device according to Embodiment 3 of the present invention.
Figure 9:
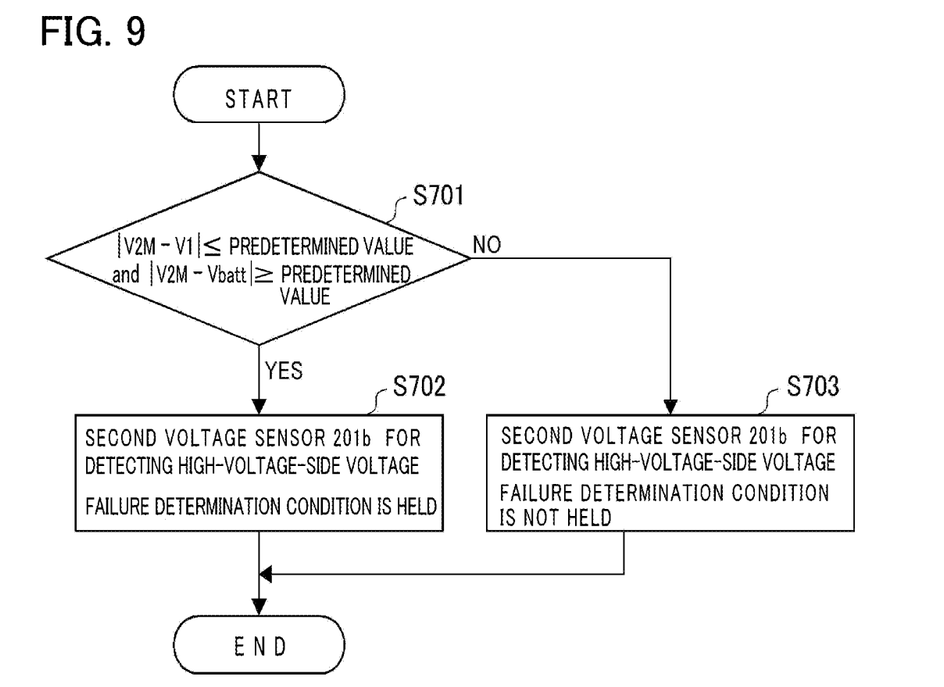
FIG. 9 is a flowchart illustrating a flow of the processing on failure determination of a voltage sensor for detecting a high-voltage-side voltage in the DC/DC converter control device according to Embodiment 3 of the present invention.

FIG. 8 and FIG. 9 are respective charts for explaining Embodiment 3 of the present invention, which are the flowcharts showing the flows of the failure determination for the first voltage sensor 201a for detecting a high-voltage-side voltage and the second voltage sensor 201b for detecting the high-voltage-side voltage, and are detailed flowcharts of a failure determination processing portion at Step S503 in FIG. for the first voltage sensor 201a for detecting a high-voltage-side voltage and the second voltage sensor 201b for detecting the high-voltage-side voltage, respectively.

As shown in FIG. 8, according to a condition of an absolute value of the difference between a low-voltage-side detection voltage V1 and a first high-voltage-side detection voltage V2S and to that of an absolute value of the difference between a battery voltage Vbatt and the first high-voltage-side detection voltage V2S (Step S601), detection/confirmation is made whether the first voltage sensor 201a for detecting a high-voltage-side voltage is caused to fail or not (Step S602 or Step S603), respectively.

Namely, when an absolute value of the difference between a first high-voltage-side detection voltage V2S and a low-voltage-side detection voltage V1 is a predetermined value defined in advance or less, and when an absolute value of the difference between a first high-voltage-side detection voltage V2S and a battery voltage Vbatt is a predetermined value defined in advance or more, it is reached that a failure determination condition of the first voltage sensor 201a for detecting a high-voltage-side voltage is held. In addition, when an absolute value of the difference between the first high-voltage-side detection voltage V2S and the low-voltage-side detection voltage V1 is not a predetermined value defined in advance nor less, nor when an absolute value of the difference between the first high-voltage-side detection voltage V2S and the battery voltage Vbatt is not a predetermined value defined in advance nor more, it is reached that a failure determination condition of the first voltage sensor 201*a* for detecting a high-voltage-side voltage is not held.

Moreover, as shown in FIG. 9, according to a condition of an absolute value of the difference between a low-voltage-side detection voltage V1 and a second high-voltage-side detection voltage V2M and to that of an absolute value of the difference between a battery voltage Vbatt and the second high-voltage-side detection voltage V2M (Step S701), detection/confirmation is made whether the second voltage sensor 201*b* for detecting a high-voltage-side voltage is caused to fail or not (Step S702 or Step S703), respectively.

Namely, when an absolute value of the difference between a second high-voltage-side detection voltage V2M and a low-voltage-side detection voltage V1 is a predetermined value defined in advance or less, and when an absolute value of the difference between a second high-voltage-side detection voltage V2M and a battery voltage Vbatt is a predetermined value defined in advance or more, it is reached that a failure determination condition of the second voltage sensor 201*b* for detecting a high-voltage-side voltage is held. In addition, when an absolute value of the difference between the second high-voltage-side detection voltage V2M and the low-voltage-side detection voltage V1 is not a predetermined value defined in advance nor less, nor when an absolute value of the difference between the second high-voltage-side detection voltage V2M and the battery voltage Vbatt is not a predetermined value defined in advance nor more, it is reached that a failure determination condition of the second voltage sensor 201*b* for detecting a high-voltage-side voltage is not held.

As described above, the determination is performed whether the first voltage sensor 201*a* for detecting a high-voltage-side voltage is caused to fail, or the second voltage sensor 201*b* for detecting a high-voltage-side voltage is caused to fail.

According to the above, the failure detection can be performed without adding a new sensor(s), and, when electric motor's induced voltages Vtrc and Vgen are low, the failure detection is performed while the second semiconductor switching device 104 is turned on; thus, by turning on the second semiconductor switching device 104, it is possible to prevent a state in which an electric motor's induced voltage Vtrc is higher than a battery voltage Vbatt, and to prevent battery's overcharging, although it is feared that, in a case in which the electric motor's induced voltages Vtrc and Vgen are higher than the battery voltage Vbatt owing to electric motor's counter-electromotive force, the battery becomes overcharged, and that the battery degrades.

Embodiment 4

Hereinafter, the explanation will be made for Embodiment 4 of the present invention. The basic configuration of a DC/DC converter control device in Embodiment 4 is the same as that illustrated in FIG. 1; however, in Embodiment 4, a processing unit 502 is provided as illustrated in FIG. 6 which receives information from the high-voltage-side voltage estimation means 303, and executes the processing when a high-voltage-side estimation voltage is low.

Figure 10:
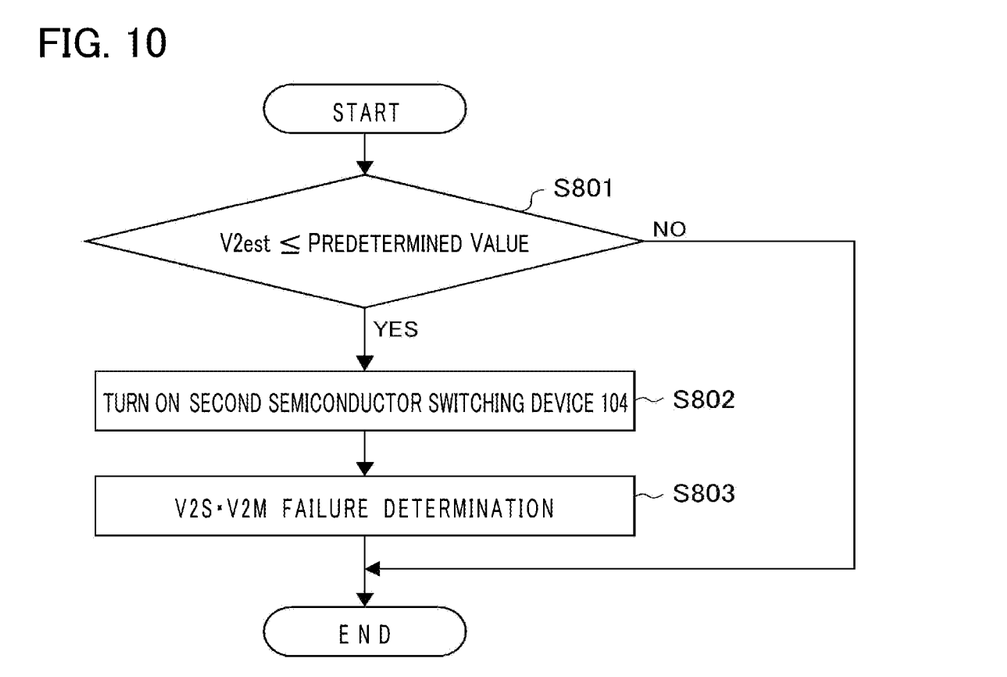
FIG. 10 is a flowchart illustrating a flow of the processing for detecting a failure of voltage sensors each for detecting a high-voltage-side voltage when a high-voltage-side estimation voltage is low in the DC/DC converter control device according to Embodiment 4 of the present invention.

FIG. 10 is a chart for explaining Embodiment 4 of the present invention, which is the flowchart showing the flow to detect a failure of the sensor after having turned on the second semiconductor switching device 104, when a high-voltage-side estimation voltage is low.

As shown in FIG. 10, when a high-voltage-side estimation voltage V2est is a predetermined value defined in advance or less (Step S801), the second semiconductor switching device 104 is turned on (Step S802), and failure determination is performed for the first voltage sensor 201*a* for detecting a high-voltage-side voltage and the second voltage sensor 201*b* for detecting the high-voltage-side voltage (Step S803).

Meanwhile, the failure determination processing portion in FIG. 10 for the first voltage sensor 201*a* for detecting a high-voltage-side voltage and the second voltage sensor 201*b* for detecting the high-voltage-side voltage is equivalent or similar to the portion of the case in Embodiment 3 described above.

That is to say, similarly to the case as shown in FIG. 8, according to a condition of an absolute value of the difference between a first high-voltage-side detection voltage V2S and a low-voltage-side detection voltage V1, and to that of an absolute value of the difference between the first high-voltage-side detection voltage V2S and a battery voltage Vbatt (Step S601), detection/confirmation is made whether the first voltage sensor 201*a* for detecting a high-voltage-side voltage is caused to fail or not (Step S602 or Step S603), respectively.

When an absolute value of the difference between a first high-voltage-side detection voltage V2S and a low-voltage-side detection voltage V1 is a predetermined value defined in advance or less, and when an absolute value of the difference between the first high-voltage-side detection voltage V2S and a battery voltage Vbatt is a predetermined value defined in advance or more, it is reached that a failure determination condition of the first voltage sensor 201*a* for detecting a high-voltage-side voltage is held.

In addition, when an absolute value of the difference between the first high-voltage-side detection voltage V2S and the low-voltage-side detection voltage V1 is not a predetermined value defined in advance nor less, nor when an absolute value of the difference between the first high-voltage-side detection voltage V2S and the battery voltage Vbatt is not a predetermined value defined in advance nor more, it is reached that a failure determination condition of the first voltage sensor 201*a* for detecting a high-voltage-side voltage is not held.

Moreover, similarly to the case as shown in FIG. 9, according to the condition of an absolute value of the difference between a low-voltage-side detection voltage V1 and a second high-voltage-side detection voltage V2M (Step S701), detection/confirmation is made whether the second voltage sensor 201*b* for detecting a high-voltage-side voltage is caused to fail or not (Step S702 or Step S703), respectively.

When an absolute value of the difference between a second high-voltage-side detection voltage V2M and a low-voltage-side detection voltage V1 is a predetermined value defined in advance or less, and when an absolute value of the difference between the second high-voltage-side detection voltage V2M and a battery voltage Vbatt is a predetermined value defined in advance or more, it is reached that a failure determination condition of the second voltage sensor 201*b* for detecting a high-voltage-side voltage is held. In addition, when an absolute value of the difference between the second high-voltage-side detection voltage V2M and the low-voltage-side detection voltage V1 is not a predetermined value defined in advance nor less, nor when an absolute value of the difference between the second high-voltage-side detection voltage V2M and the battery voltage Vbatt is not a predetermined value defined in advance nor more, it is reached that a failure determination condition of the second voltage sensor 201b for detecting a high-voltage-side voltage is not held.

As described above, the determination is performed whether the first voltage sensor 201a for detecting a high-voltage-side voltage is caused to fail, or the second voltage sensor 201b for detecting a high-voltage-side voltage is caused to fail.

According to the above, even in a state in which either one of the first voltage sensor 201a for detecting a high-voltage-side voltage and the second voltage sensor 201b for detecting a high-voltage-side voltage is caused to fail, the DC/DC converter can safely perform its gate turn-on in a state in which it does not undergo overvoltages.

Embodiment 5

Hereinafter, the explanation will be made for Embodiment 5 of the present invention. The basic configuration of a DC/DC converter control device in Embodiment 5 is the same as that illustrated in FIG. 1.

Detection accuracy of the first voltage sensor 201a for detecting a high-voltage-side voltage is so arranged as to be higher in accuracy than that of the second voltage sensor 201b for detecting the high-voltage-side voltage, and a detection delay of the second voltage sensor 201b for detecting the high-voltage-side voltage is so arranged as to be shorter in length than that of the first voltage sensor 201a for detecting a high-voltage-side voltage. A feature resides in the configuration that the DC/DC converter controls its output voltage by using the first voltage sensor 201a for detecting a high-voltage-side voltage, and an inverter of the electric motor 2 controls the electric motor 2 by using the second voltage sensor 201b for detecting the high-voltage-side voltage. By taking the configuration described above, it is no more necessary to use the sensors having the same function with each other, so that, by distributing their functions, reduction of costs can be achieved.

Embodiment 6

Hereinafter, the explanation will be made for Embodiment 6 of the present invention. The basic configuration of a DC/DC converter control device in Embodiment 6 is the same as that illustrated in FIG. 1.

Detection accuracy of the first voltage sensor 201a for detecting a high-voltage-side voltage is so arranged as to be higher in accuracy than that of the second voltage sensor 201b for detecting the high-voltage-side voltage described above, and a detection delay of the first voltage sensor 201a for detecting a high-voltage-side voltage is so arranged as to be shorter in length than that of the second voltage sensor 201b for detecting the high-voltage-side voltage. A feature resides in the configuration that the DC/DC converter controls its output voltage by using the first voltage sensor 201a for detecting a high-voltage-side voltage, and an inverter of the electric motor 2 controls the electric motor 2 by using the first voltage sensor 201a for detecting a high-voltage-side voltage, and that, when a failure of the first voltage sensor 201a for detecting a high-voltage-side voltage is detected, the second voltage sensor 201b for detecting the high-voltage-side voltage is used. By taking the configuration described above, the second voltage sensor 201b for detecting the high-voltage-side voltage can be made inexpensive.

Figure 11:
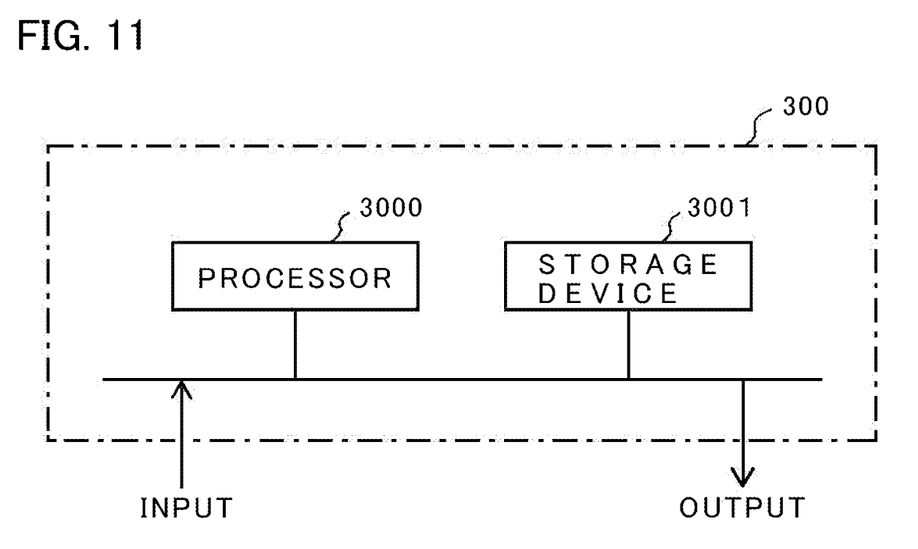
FIG. 11 is a diagram illustrating a hardware configuration of the control device by way of an example in the DC/DC converter control device according to each of Embodiments.

It should be noted that, as an example of hardware is illustrated in FIG. 11, the control device 300 is constituted of a processor 3000 and a storage device 3001. The storage device is provided with a volatile storage device of a random access memory or the like, and with a nonvolatile auxiliary storage device of a flash memory or the like, which are not shown in the figure. In addition, in place of the flash memory, an auxiliary storage device of a hard disk may be provided with. The processor 3000 executes a program(s) inputted from the storage device 3001. In this case, the program(s) is inputted into the processor 3000 from the auxiliary storage device by way of the volatile storage device. Moreover, the processor 3000 may output its data of a calculated result(s) or the like into the volatile storage device of the storage device 3001, or may store the data into the auxiliary storage device by way of the volatile storage device.

Note that, the present invention is not necessarily limited to each of those embodiments described above, and so it is needless to say that all of the possible combinations of those embodiments are included. In addition, the explanation is made in the embodiments for the configuration in that the semiconductor switching devices are two; however, even in a configuration in which three or more semiconductor switching devices are used, it is needless to say that those effects similar to the effects described above can be obtained.

EXPLANATION OF NUMERALS AND SYMBOLS

In the present invention, each of the embodiments can be freely combined, and/or each of the embodiments can be appropriately modified or eliminated without departing from the scope of the invention.

What is claimed is:

1. A DC/DC converter control device in which a DC/DC converter has a reactor whose one end is connected to a DC power source and has a switching circuit being configured to include a plurality of semiconductor switching devices and being connected to another end of the reactor, and converts an input voltage inputted from the DC power source and outputs a voltage after converting the voltage inputted therefrom as an output voltage, the DC/DC converter control device, comprising:
   a low-voltage-side voltage sensor for detecting a low-voltage-side voltage being the input voltage;
   a low-voltage-side voltage detector for outputting a voltage detected by the low-voltage-side voltage sensor;
   a first high-voltage-side voltage sensor for detecting a high-voltage-side voltage being the output voltage, wherein a first input of the first high-voltage-side voltage sensor is connected directly to a high-voltage-side circuit bus;
   a first high-voltage-side voltage detector for outputting a voltage detected by the first high-voltage-side voltage sensor;
   a second high-voltage-side voltage sensor for detecting the high-voltage-side voltage being the output voltage, wherein a second input of the second high-voltage-side voltage sensor is connected directly to the same high-voltage-side circuit bus as the first input of the first high-voltage-side voltage sensor;
   a second high-voltage-side voltage detector for outputting a voltage detected by the second high-voltage-side voltage sensor; and
   a failure detection device for detecting a failure of the first high-voltage-side voltage sensor and that of the second high-voltage-side voltage sensor, wherein change-over control is performed on respective turn-on or turn-off of the plurality of semiconductor switching devices by using a low-voltage-side detection voltage by means of the low-voltage-side voltage detector, a first high-voltage-side detection voltage by means of the first high-voltage-side voltage detector, and a second high-voltage-side detection voltage by means of the second high-voltage-side voltage detector.

2. A DC/DC converter control device in which a DC/DC converter has a reactor whose one end is connected to a DC power source and has a switching circuit being configured to include a plurality of semiconductor switching devices and being connected to another end of the reactor, and converts an input voltage inputted from the DC power source and outputs a voltage after converting the voltage inputted therefrom as an output voltage, the DC/DC converter control device, comprising:

a low-voltage-side voltage sensor for detecting a low-voltage-side voltage being the input voltage;

a low-voltage-side voltage detector for outputting a voltage detected by the low-voltage-side voltage sensor;

a first high-voltage-side voltage sensor for detecting a high-voltage-side voltage being the output voltage;

a first high-voltage-side voltage detector for outputting a voltage detected by the first high-voltage-side voltage sensor;

a second high-voltage-side voltage sensor for detecting the high-voltage-side voltage being the output voltage;

a second high-voltage-side voltage detector for outputting a voltage detected by the second high-voltage-side voltage sensor; and a failure detection device for detecting a failure of the first high-voltage-side voltage sensor and that of the second high-voltage-side voltage sensor, wherein change-over control is performed on respective turn-on or turn-off of the plurality of semiconductor switching devices by using a low-voltage-side detection voltage by means of the low-voltage-side voltage detector, a first high-voltage-side detection voltage by means of the first high-voltage-side voltage detector, and a second high-voltage-side detection voltage by means of the second high-voltage-side voltage detector wherein, when a failure of a high-voltage-side voltage sensor for detecting a high-voltage-side voltage is detected corresponding thereto by means of a comparison made between said first high-voltage-side detection voltage or said second high-voltage-side detection voltage and a high-voltage-side estimation voltage, and a failure is detected on a high-voltage-side voltage sensor for detecting a high-voltage-side voltage on one side, a high-voltage-side semiconductor switching device connected between an end of the reactor and that of the DC/DC converter on its high potential side is turned on, and also abnormality of the output voltage is detected by using a high-voltage-side detection voltage outputted by a high-voltage-side voltage detector corresponding to a high-voltage-side voltage sensor for detecting a high-voltage-side voltage to which failure detection thereon is not caused, whereby a failure of a high-voltage-side voltage sensor is detected by using a high-voltage-side detection voltage outputted by a high-voltage-side voltage detector corresponding to a high-voltage-side voltage sensor for detecting a high-voltage-side voltage to which failure detection thereon is not caused, and using a low-voltage-side detection voltage outputted by the low-voltage-side voltage detector corresponding to the low-voltage-side voltage sensor.

3. The DC/DC converter control device as set forth in claim 2, wherein, when induced-voltage information of an electric motor for indicating an induced voltage calculated from a number of revolutions of the electric motor connected to the DC/DC converter, and drive information for indicating a switching state of the high-voltage-side semiconductor switching device demonstrate a state in which the high-voltage-side semiconductor switching device is fixed in that of turn-off, a high-voltage-side voltage is estimated in accordance with information of an induced voltage applied across an electrical discharge resistor of the DC/DC converter, and with a value of the electrical discharge resistor and a value of a high-voltage-side capacitor of the DC/DC converter.

4. The DC/DC converter control device as set forth in claim 2, further comprising an operational information acquisition device for acquiring induced-voltage information of an electric motor for indicating an induced voltage of the electric motor connected to the DC/DC converter, wherein the high-voltage-side semiconductor switching device connected between an end of the reactor and that of the DC/DC converter on its high potential side is turned on, when a difference between said low-voltage-side detection voltage and an induced voltage of the electric motor is a predetermined value defined in advance or less, and also a failure of a high-voltage-side voltage sensor is detected by means of a comparison made between said low-voltage-side detection voltage and said high-voltage-side detection voltage.

5. The DC/DC converter control device as set forth in claim 4, further comprising a high-voltage-side voltage estimation device for estimating a high-voltage-side voltage from induced-voltage information of the electric motor, and from drive information for indicating a switching state of the high-voltage-side semiconductor switching device, wherein the high-voltage-side semiconductor switching device connected between an end of the reactor and that of the DC/DC converter on its high potential side is turned on, when a high-voltage-side estimation voltage of the DC/DC converter obtained by the high-voltage-side voltage estimation device is a predetermined value defined in advance or less.

* * * * *